United States Patent [19]

Zelkowitz

[11] Patent Number: 4,465,534
[45] Date of Patent: Aug. 14, 1984

[54] APPARATUS AND METHOD FOR UPHOLSTERING A RIGID CHAIR SHELL

[75] Inventor: Hyman L. Zelkowitz, West Norriton, Pa.

[73] Assignee: Knoll International, Inc., New York, N.Y.

[21] Appl. No.: 555,450

[22] Filed: Nov. 28, 1983

Related U.S. Application Data

[60] Continuation of Ser. No. 394,539, Jul. 2, 1982, abandoned, which is a division of Ser. No. 40,306, May 18, 1979, Pat. No. 4,357,723.

[51] Int. Cl.³ .......................... B29C 27/22; B32B 31/20
[52] U.S. Cl. ............................................. 156/91; 5/403; 156/212; 156/229; 297/218; 297/456
[58] Field of Search ............... 156/91, 212, 213, 221, 156/245, 286, 382, 229, 581; 5/403; 297/218, 456

[56] References Cited

U.S. PATENT DOCUMENTS

| | | | |
|---|---|---|---|
| 2,989,112 | 6/1961 | Sonnleitner | 156/213 |
| 3,146,143 | 8/1964 | Bolesuy et al. | 156/212 |
| 3,273,178 | 9/1966 | Baruth et al. | 5/403 |
| 3,322,598 | 5/1967 | Marks et al. | 156/285 |
| 3,453,166 | 7/1969 | Herriott et al. | 156/295 |
| 3,485,698 | 12/1969 | Marsh | 156/286 |
| 3,554,834 | 1/1971 | Bennett et al. | 156/285 |
| 3,589,967 | 6/1971 | Shirakawa | 156/382 |
| 3,633,968 | 1/1972 | Sears et al. | 5/403 |
| 3,697,369 | 10/1972 | Amberg et al. | 156/212 |
| 3,758,159 | 9/1973 | Morris | 5/403 |
| 3,878,015 | 4/1975 | Johnston | 156/226 |

*Primary Examiner*—Michael G. Wityshyn
*Attorney, Agent, or Firm*—Robert Scobey

[57] ABSTRACT

An apparatus and method for upholstering a rigid chair shell is disclosed. A continuous, generally C-shaped track is utilized about the peripheral edge of the shell, opening rearwardly thereof to receive a retaining element attached about the peripheral edge of the covering material. The retaining element is constructed from a strip of tubular flexible material with an integral flap member circumferentially overlying at least part of the tubular strip and accepting the track edge therebetween. The inside surface of the outer end of the flap member is attached to the inside surface of the edge of the cover or fabric and, after suitable cushioning is attached to the front surface of the shell, the covering is placed over the cushioning and rolled about the retaining element which is snapped into the C-shaped track around the periphery of the shell to hold the covering thereon. Upon rolling into the track the tubular body is seated in the track cavity, and the free edge of the track extends into the space between the tubular body and the flap member with the fabric end disposed therebetween, thus locking the element against the track edge preventing roll-out and distributing the stress on the fabric while blending the region between the cushion and shell edges and obscuring the retaining element from view. The composite cover, cushion, and shell is then placed face up in an upholstery mold and heat and pressure applied from above to conform and attach the cover to the cushion by activating a non-tacky cover-cushion adhesive on the surface of the cushion, and a finished composite chair results upon removal from the mold. For reupholstery purposes, a replacement fabric, cushion and retaining element may be preformed and locked onto a shell by rolling the retaining element into the track, after the original covering, retaining element, and cushioning have been cut and removed.

16 Claims, 9 Drawing Figures

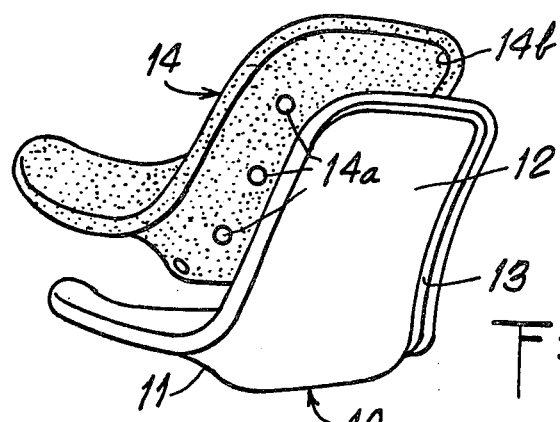
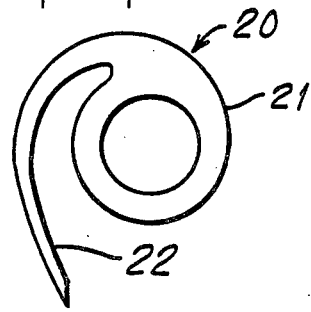
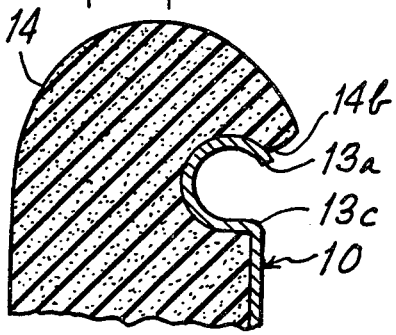
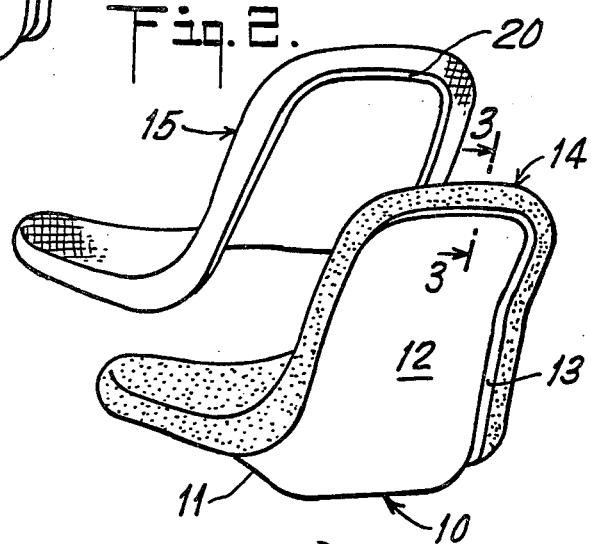
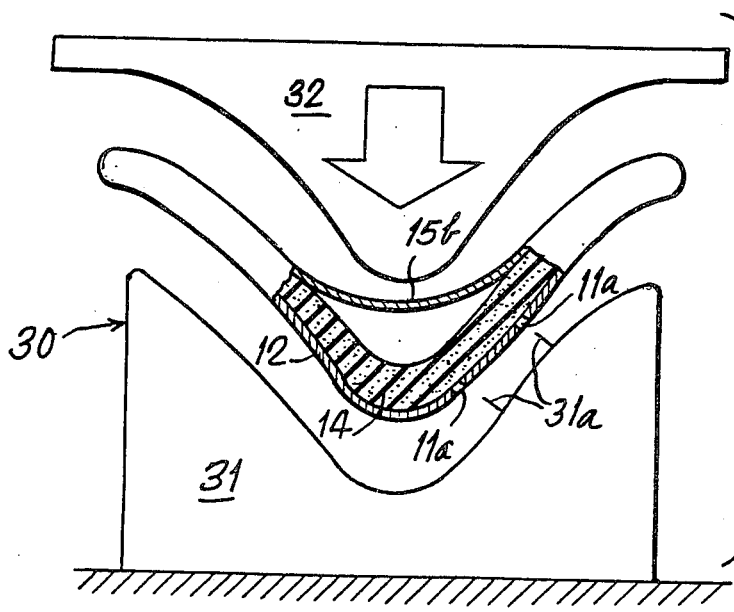

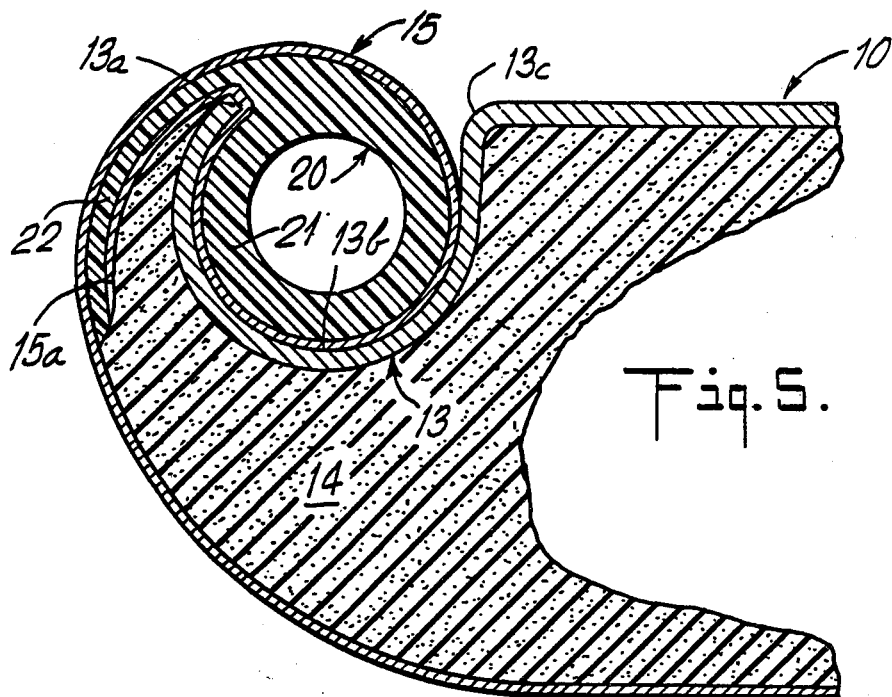
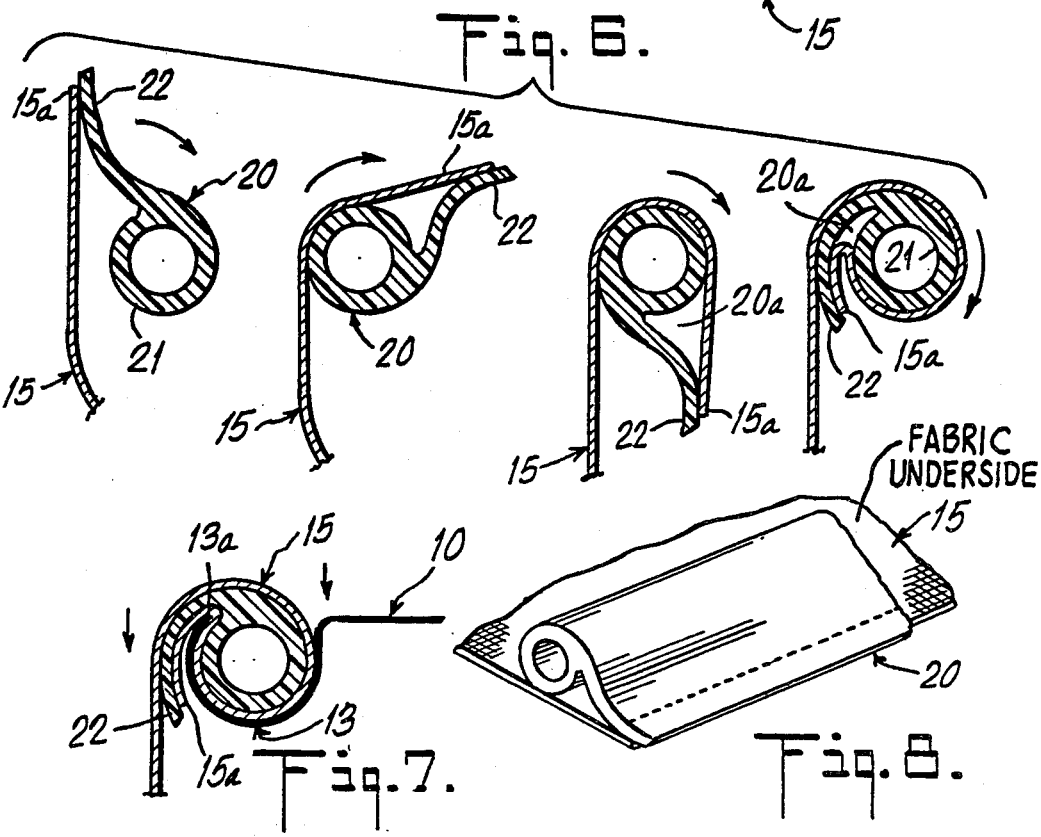

APPARATUS AND METHOD FOR UPHOLSTERING A RIGID CHAIR SHELL

This is a continuation of Ser. No. 394,539, filed July 2, 1982, now abandoned; which is a division of Ser. No. 040,306, filed May 18, 1979, now U.S. Pat. No. 4,357,723.

BACKGROUND OF THE INVENTION

The present invention is directed to the upholstery art and more particularly to an improved apparatus and simplified method for upholstering a rigid chair shell or like article of furniture.

It is common practice in the furniture-making art, as evidenced, for example, by U.S. Pat. No. 3,713,697 to Koepke, to construct chairs, such as upholstered office chairs, using a rigid chair shell to which cushioning and covering are applied before a supporting leg structure is secured to the underside. Such chairs may be of relatively complex construction, and can be difficult and expensive to produce. The Koepke patent suggests a process for significantly simplifying the construction technique but still requires tools and a number of manual operations in tacking and releasing the edge portions of the upholstery cover during the forming operation and subsequent bonding of the cover to the shell.

Another prior art approach to securing a seat or upholstery cover to a rigid chair structure is disclosed in U.S. Pat. No. 3,273,178 to Baruth et al. wherein a C-shaped member is provided about the periphery of a seat structure and the terminal portions of the seat cover are inserted and held therein by means of a two-lobed welt in combination with a bonding material. While the Baruth et al. procedure may not require as many manual operations as the Koepke process, it does involve the problem of the insertion in the channel of the binding cement and welt and the composite arrangement extends outwardly from, and affects the external appearance of, the finished chair.

Another approach is represented by Neely U.S. Pat. No. 3,040,343. A flexible plastic strip is utilized as part of a trim connector, and is placed into a U-shaped channel, with a covering material extending thereabout. There is nothing retaining the plastic strip within the channel, and the strip and cover may be easily pried from the channel.

The present invention is directed to a process and apparatus which improved upon these prior practices for upholstering rigid seat or chair shells by simplifying and eliminating many of the necessary manual operations while producing a chair of improved durability and appearance.

It is accordingly an object of the present invention to provide a simplified and effective process for upholstering a rigid chair shell or other article of furniture.

It is a further object of the present invention to provide an improved means for retaining the covering or fabric edge about the periphery of the shell or other portion of a like article.

It is another object of the present invention to provide a method and means for producing a chair of improved quality and appearance.

It is an additional object of this invention to facilitate the re-upholstering of a rigid chair shell or like article.

SUMMARY OF THE INVENTION

The present invention involves a method and means for upholstering or reupholstering a rigid seat or chair shell or like article of furniture with a suitable covering and cushioning, while requiring a minimal number of tools and operations. To facilitate the attachment of the covering, over the cushioning, to the shell, a continuous generally C-shaped track is utilized about the peripheral edge of the shell, opening rearwardly thereof and receiving a retaining member or element attached to the peripheral edge of the covering. The retaining element is constructed of a strip of flexible material, preferably having a central body portion of generally circular cross section, e.g., tubular, with an integral flap member overlying at least part of the surface of the central body portion. The inside surface of the outer end of the flap member is attached to the inside surface of the edge of the covering to form a closed loop about its periphery. The covering with the attached retaining element is placed over the front surface of the shell onto which the cushioning has been fastened, and the edge of the covering is then rolled about the retaining element, and the element is rolled into the C-shaped track section by section around the periphery of the shell. Rolling of the element seats the rounded central body portion in the track cavity with the free edge of the track extending into the space between the body portion and the flap member with the edge of the covering disposed therebetween. The retaining element with covering wrapped thereabout are thus locked in the track preventing roll-out and distributing the stress on the covering while blending the region between the cushion and shell edge and obscuring the retaining element beneath the covering.

During initial construction, the cushioning may be first attached to the front of the shell and the covering is then locked thereover. During reupholstering, on the other hand, the covering and cushioning may be preformed as a unit before application to the shell and then locked onto the shell after the original covering and cushioning have been cut and removed.

When the covering is a stretchable fabric, the composite fabric, cushion, and shell may be placed face up in a heated mold and heat and pressure applied from above, stretching the fabric and bonding it to the cushion by activating a heat and pressure sensitive adhesive on the surface of the cushion, further tightening the retaining element in the track and securing the covering to the cushion. A finished chair may then be removed from the mold ready for attachment to a suitable base structure.

The use of the retaining element with attached covering and cooperating track may be utilized on many different articles of furniture and other applications wherein it is desired to attach a flexible edge of a covering or panel to a rigid supporting member. The stretching of edge-secured fabric into place provides an enhanced method of upholstering, since all edge finishing is completed prior to adhering the fabric to the substrate, and a smooth fabric surface may be ensured by progressively bonding the fabric to the substrate with a bond that varies from very strong in the center of the article of furniture to a weak bond at the periphery of the article.

The invention will be more completely understood by reference to the following detailed description.

BRIEF DESCRIPTION OF THE DRAWINGS

FIG. 1 is a perspective view of a chair shell member having a continuous peripheral retaining track and a cooperating cushion member useful in the present invention.

FIG. 1a is an end view of a flexible retaining element in accordance with the invention.

FIG. 2 is a perspective view as in FIG. 1 showing the shell member with cushion member attached and a cooperating fabric covering member having a peripherally connected retaining element in accordance with the present invention.

FIG. 3 is a sectional view, to an enlarged scale, taken along the section 3—3 in FIG. 2.

FIG. 4 is a side view, partly in section, showing the composite fabric, cushion and shell members disposed for final forming in a heated upholstery mold.

FIG. 5 is a sectional view illustrating the relationship of the shell cushion, fabric and retaining members in accordance with the invention.

FIG. 6 illustrates the steps in attaching a fabric to the retaining element and rolling the element, preparatory to insertion into the retaining track.

FIG. 7 illustrates the rolled element of FIG. 6 inserted into the retaining track to form the improved retaining means of the present invention.

FIG. 8 is a perspective view of the retaining element and fabric.

DETAILED DESCRIPTION OF THE INVENTION

The present invention will perhaps best be understood from a description of a preferred method for carrying out the construction of a chair in accordance therewith.

Referring to FIG. 1, a chair shell member 10 is shown formed out of rigid material, such as steel or suitable plastic, into a desired shape having a seat portion 11 and a backrest portion 12 and including a continuous, generally C-shaped retaining track 13 opening rearwardly about the periphery. A cushion member 14 for attachment to the front or inner surface of the shell member 10 is formed into an appropriate shape from a suitable resilient material such as a plastic foam. The front or inner surfaces of the seat and backrest portions 11, 12 may be covered with a contact adhesive preparatory to the attachment of the cushion member 14, but preferably suitable fastening elements (not shown) are formed on the front shell surfaces cooperating with elements 14a on the cushion to permit the cushion to be snapped onto the shell. The cushion member 14 may have a contact adhesive applied to its rear surface, so that it and the shell may be joined into a composite as shown in FIG. 2. When the preferred snap-on arrangement is used, the peripheral edge of the cushion foam is formed with an undercut 14b which neatly overlies the peripheral edge of the retaining track 13 in the manner shown in section in FIG. 3 and obviates the need for carefully matching the foam edge to the steel edge at the edge of the track.

A cover member 15 is prepared by rolling out a suitable fabric or plastic sheeting and cutting or "clicking" it into pattern shape, as shown in FIG. 2, for fitting over the cushion-shell composite. The covering pattern may be shirred at the corners for properly conforming it to the rounded corners of the composite and retaining element 20 is attached about its rear peripheral edge.

The retaining element 20 in accordance with the invention, shown in FIG. 1a, is a length of flexible material such as extruded rubber or plastic which is cut to size to extend about the periphery of the cover member 15, and its ends may be bonded to form a continuous loop. This loop is attached to the periphery of the cover member 15 such as by sewing if the member is of a fabric (as in FIG. 8), or by heat sealing, e.g., if the member is of a plastic such as vinyl. In particular, as shown in the first step of FIG. 6, the inner surface of the edge 15a of the cover member 15 is connected to the inner edge of a flap member portion 22 of the retaining element 20. The retaining element 20, as seen in FIGS. 5–7 (and in FIG. 1a in unstressed form), is preferably constructed from a material having a generally circular cross section in a central body portion 21, with an integral flap 22 spaced from and extending adjacent to and at least partially circumferentially about the central body portion 21. The flap member 22 is thus integrally connected to the rounded body portion 21 and overlies an area of its peripheral surface. The length of the flap member may be varied as desired to suit particular applications, as will be appreciated by those skilled in the art in view of the present description. The central body portion 21 is preferably tubular to permit its collapsing during insertion into the retaining track, as explained below.

Returning to the chair construction method, the cover member 15 formed, for example, of a fabric pattern with the preferred retaining element 20 attached as indicated, in then placed over the cushion-shell composite, and the edge of the fabric is rolled about the retaining element 20 in the manner shown in the successive steps in FIG. 6. The retaining element 20 with the fabric so rolled about it is then rolled and snapped, portion by portion along its periphery, into the C-shaped retaining track 13 about the peripheral edge of the shell member 10. Since the central body portion is tubular, it can be collapsed to facilitate its insertion into the track 13, whereupon it expands to the shape shown in FIG. 7 and is retained within the track. It will be seen in FIGS. 5 and 7 that the free edge 13a of the retaining track extends into the space or recess 20a between the rounded body portion 21 of the element 20 and flap member 22, drawing the end of the fabric 15 therein and the rounded body portion 21 fits into the track recess or cavity 13b with the fabric end 15a disposed therebetween. With this configuration, the cooperation of the surfaces of the element 20 and of the track 13, with the fabric end 15a disposed between them, creates a two-part capture by means of a two-track system, that is, the mating of the external track (the C-shaped recess 13b) and the internal track (the retaining element 20). The mating of the free edge 13a on the external track and the flap member 22 on the internal track stops the interposed covering or fabric end 15a and the retaining element 20 from rolling out of the external track, and primary capture is provided by this mating when the fabric is drawn away from the track as shown. The closure of the C-shaped external track is a secondary capture. The flap member 22 and the extra revolution of the fabric end 15a redirects the stress on the fabric from one edge to the entire surface of the retaining element 20 it is encircling. This indirect route relieves the strain on the fabric and creates a softer-looking visual detail on the outer surface than is otherwise possible. As the form of the retaining element 20 is based on a spiral within a circle, it curls tightly around the free edge 13a of the C-shaped track 13 and even around the corners and blends the fabric edge 15a at the edge of the cushion member 14 as shown in FIG. 5. The rolling action of the retaining element and fabric combination takes up the excess fabric created by encapsulating the corners of the shell member 10 in the fabric, by becoming fatter as it rolls (fabric is being rolled about the retaining element and fabric).

When the C-shaped track or groove 13 on the shell member is formed as an integral part of the shell member rather than by means of a separate element, only a single sharp surface is formed, that is, by the free edge 13a, the inner edge 13c being formed by a roll of the shell material. Also, when the retaining track 13 is continuous about the periphery of the shell member, the retaining element 20 is simply snapped into place about the track, and the need for insertion and sliding into an open-ended track, common in the art, is obviated. Accordingly, these constructions of the track are preferred, but a separate track element of discontinuous track may be used when a particular application makes it desirable or necessary.

It will thus be noted from FIG. 5, in particular, that the covering material 15 is secured to one side (the inside) of the flap portion 22 of the retaining element and extends from that side around the enlarged central portion 21 of the retaining element and across the other side (the outside) of the flap 22 and thence about the body of the cushion. The central body portion, so wrapped with covering material, is positioned within the track channel 13b, and the flap, so wrapped with flexible covering material, is positioned outside that channel. The free edge 13a of the track underlies the flap 22. This configuration creates a very secure upholstery connection and virtually prevents removal of that connection from the track without cutting the retaining element to remove it. The retaining element is preferably made tubular to simplify its insertion into the retaining track 13. All that is basically visible to the eye is the finishing upholstery fabric itself. The retaining element flap 22 is smoothly blended with the cushioning or padding material 14 as shown in FIG. 5, and the free track edge portion 13a is covered not only by such cushioning material but also by upholstery fabric and retaining element flap 22. A smooth finish to the touch is thus presented by this construction.

Again returning to the method of constructing the chair, with the retaining element 20 held in retaining track 13 by the tension of the stretched or drawn fabric or cover member 15 as described. The composite of the fabric, cushion, and shell members is ready to be placed in a heated upholstery molding apparatus 30 such as shown in FIG. 3. It should be noted that, at this time, all edge finishing of the chair is completed. Prior to being covered, the front surface of the cushion member 14 is preferably coated with a bonding agent, such as by spraying with a suitable cover-cushion adhesive, that will dry with a waxy non-tacky surface and be activated by radiation, e.g., heating a nitrile based thermoplastic adhesive is suitable. The composite fabric, cushion and shell members may then be placed in the mold bed 31 (FIG. 4) rear downwardly and properly positioned therein by the conforming shapes and alignment pins 31a which cooperate with mounting holes 11a in the seat portion 11 of the shell. A heated press member 32 is applied from above, forcing the fabric-bridging pocket 15b formed on the front of the chair into full contact with the front surface of the cushion member 14. The fabric is stretched by the pressing, and the heat activates the cover-cushion adhesive, bonding the fabric to the cushion. Since the heated mold first comes into contact with the fabric portion which is spanning the seat pocket and not in contact with the cushion, and since there is no adhesive on the fabric, the fabric is permitted to stretch all over without any activation of the adhesive until the press closes. At the last instant in the press cycle the fabric has been stretched into place and it and the cushioning are compressed while the adhesive activates, sealing the fabric to the front surface of the cushion in complete conformance to the ultimate shape of the chair. This heat sealing of the fabric in place removes some of the fabric stretch and further prevents removal of the retaining element 20 from the retaining track 13 (although the arrangement has previously been locked in place against manual removal upon insertion) and thus the removal is made even more difficult.

It is thus apparent that contact is first made between central parts of the interior portions of the covering material 15 and shell or substrate 11. Contact then proceeds outwardly toward the peripheral portions. Preferably the die 32 is shaped to conform generally to the shell or substrate 12, but it is undercut progressively moving outwardly from the central part of the die 32 to the peripheral portions so that greater contact between the die and the stretchable upholstery fabric 15 takes place in the central part of the fabric, decreasing toward the peripheral portions. The glue bond between fabric and cushioning or padding material is thus greatest in the central part thereof and progressively decreases toward the peripheral portions thereof. In this fashion, toward the edge of the chair shell, litte or no glue bond is present and the glue bond is thus "feathered" so that it is not noticable to the touch. Additionally, an advantage of so feathering the glue bond is that there is no glue bond in the region of the retaining element 20. Thus the fabric is permitted to move with respect to the underlying cushion or padding material, and no wrinkles are produced in the fabric either at the time of the construction of the chair or during use of the chair as, e.g., when a person sits in or removes himself from the chair.

A completely formed chair may then be removed from the molding apparatus 30 and racked for further assembly operations such as the fitting of a suitable base structure.

It will be seen that with the edge construction of the present invention, since the covering or fabric is rolled over the improved retaining element, in its final position the element 20 after being simply snap-locked in place in the continuous track 13 is hidden by the fabric and not visible. It is captured in both the track slot or cavity 13b and by the edge 13a, and this hold is made stronger by the final forming of the fabric to the shape of the cushion, since this action removes all excess stretch from the fabric and forces the free edge 13a of the retaining track 13 into the space 20a between the element body 21 and flap member 22. The flap member 22 locks the element 20 against the track edge 13a to stop rollout and shields the exterior fabric from the edge, blending the area between the edge of the cushion and the edge of the shell member. The geometry of the retaining element 20 is such that it hugs the edge 13a of the track as it goes around the corners, and the locking makes it nearly impossible to remove by hand unless cut. The stress on the fabric allows the shell member 10 to be preupholstered in a clean operation without the need for special tools before the final fabric sealing step, since the adhesive between the cushion and the fabric is dry prior to being heat reactivated during that step. Following the final fabric sealing step a completely formed seat or chair is obtained upon removal from the mold without the need for additional finishing operations.

In addition to the manufacture of new furniture, such as the described chair, the present invention also facilitates reupholstering of such furniture. When it is desired to replace the original covering or fabric, since it is locked against manual removal on the shell by the retaining means, the retaining element and covering may be cut and the covering and cushioning readily removed from the shell. It is apparent that, for reupholstering, it is preferable to snap the original cushioning on the shell, rather than adhesively bonding it thereto. A replacement cover and cushion, adhesively bonded together, will be supplied for reupholstering purposes. The replacement covering and cushioning will be preformed and have the retaining element attached to the upholstery material for installation on the shell by the reupholsterer. To produce such a cushion/upholstery material composite, a retaining fixture (not shown) may be constructed which takes the place of the rigid shell 12 shown in FIG. 4, but not with a one-way capture track, such as track 13, so that the cushion/upholstery material composite may be removed from that fixture. Such a fixture could employ a track in the form of a half C (e.g., subtending an arc of of about 120°), so that the retaining element could easily be removed from the track of the fixture.

It should be noted that the above techniques are applicable to non-cushioned installations. Futher, when a vinyl covering is used, the cover must be preformed, rather than just stretched into shape, since the vinyl is not conducive to stretching into shape in the manner described in the previous heat-bonding process.

In reupholstering, a preformed covering with the retaining element attached, and including attached cushioning where necessary, may then be substituted for the removed original covering by the simple rolling and snapping-on operation about the periphery of the original shell without the need for special tools or any heat-sealing or other processing at the site of the installation. Thus reupholstering furniture in accordance with the present invention may be carried out quickly and inexpensively, at any site where the furniture is located, by an unskilled person, manually without the need for any tools.

The applicability of the present invention to all forms of furniture in addition to the integral chair and process described, such as chairs with separate seats and backs, and those not involving heat-sealing operations or special preforming, will be readily apparent to the skilled artisan as well as its applicability in many other arts wherein a connection or joint between any form of material with a flexible edge and a comparatively rigid support member or base is desired. Further, modification of the preferred embodiments disclosed will be apparent to those skilled in the art. Accordingly, the invention should be taken as defined by the following claims.

I claim:

1. A method of attaching a flexible covering to a support member and utilizing a retaining element made of a length of flexible material having a central body portion and a flap integral with said central body portion, said flap being spaced from and extending adjacent to and at least partially circumferentially about an external surface of said central body portion, in which said support member includes a channel member having a free edge, comprising the steps of attaching said covering to said flap on an inside surface of said flap, adjacent to said central body portion, wrapping said covering about said central body portion and an outside surface of said flap, and positioning said central body portion within said channel member with at least part of said flap being positioned outside said channel member and said free edge of said channel member being positioned between said flap and said central body portion.

2. In a method according to claim 1, in which said support member comprises a shell that includes said channel member thereon, the further step comprising adhesively securing said flexible covering to said shell.

3. A method according to claim 2, in which said shell includes padding material secured thereto, and said flexible covering is adhesively secured to said padding material.

4. A method according to claim 1, in which said flexible covering is of stretchable material, and said support member comprises a shell that includes said channel member thereon, and in which, when said central body portion of said retaining element is positioned within said channel member, portions of said stretchable material are spaced from portions of said shell, the further steps comprising stretching said stretchable material so that said portions thereof are in contact with said portions of said shell, and adhesively securing said stretchable material portions and said shell portions together.

5. A method of attaching a covering of stretchable material to a substrate, said substrate being constituted of a foam covered shell or the like, comprising the steps of attaching a peripheral portion of said covering material to a peripheral portion of said substrate, with an interior portion of said covering material being spaced from an interior portion of said substrate, stretching said covering material so that said interior portion thereof is brought into contact with said interior portion of said substrate, and adhesively securing together said interior portion of said covering material and said interior portion of said substrate with an adhesive bond therebetween that progressively varies throughout said interior portions proceeding from said interior portions to said peripheral portions with little or no bond at said peripheral portions.

6. A method according to claim 5, in which said interior portion of said substrate is coated with a radiation-activatable adhesive, and said covering material is stretched by use of a radiation-emitting die in contact therewith.

7. A method according to claim 5, in which contact is first made between central parts of said interior portions of said covering material and substrate, and contact between said interior portions then proceeds outwardly toward said peripheral portions.

8. A method according to claim 7, in which the adhesive bond between said interior portions decreases in amount from said central parts toward said peripheral portions.

9. A method according to claim 8, in which said peripheral portions are mechanically but non-adhesively secured together.

10. A method according to claim 5, in which said covering material is stretched by use of a die having a substrate-contacting surface which is shaped to conform generally to said substrate but which is progressively more undercut with respect to said substrate proceeding outwardly from said interior portions to said peripheral portions.

11. A method according to claim 5, in which said covering material is attached at its periphery to said shell, and there is no glue bond between said covering material and the foam covering of said shell in the region immediately adjacent to the attachment of said covering material to said shell.

12. In an upholstery process for covering a surface of an article of furniture, said article including a track having a cavity and at least one free edge, with the opening to said cavity facing away from said surface to be covered, and wherein a covering material is shaped to fit over said surface, the improvement comprising attaching an edge of said covering material to an integral flap portion that is part of a retaining element that includes an enlarged portion, placing said covering material over said surface and retaining it thereon by rolling said edge of said covering material about said retaining element and inserting the enlarged portion of said retaining element in the track cavity with said free track edge extending between said enlarged and flap portions of said retaining element so that said flap portion covered by covering material is disposed outside said track.

13. A process an in claim 12, in which said shell is covered with a padding material, and comprising the further steps of applying a heat activatable adhesive to an exposed surface of said padding material before affixing the covering material to said shell, and disposing the composite covering material and padding material and shell in a heated upholstery mold and applying pressure to conform and attach said covering material to said padding material.

14. A method of attaching a covering of stretchable material to a substrate, said substrate being constituted of a foam covered shell or the like, comprising the steps of attaching a peripheral portion of said covering material to a peripheral portion of said substrate, with an interior portion of said covering material being spaced from an interior portion of said substrate, stretching said covering material so that contact is first made between central parts of said interior portions of said covering material and substrate, and contact between said interior portions then proceeds outwardly toward said peripheral portions, and adhesively securing together said interior portion of said covering material and said interior portion of said substrate with an adhesive bond which decreases in amount from said central parts toward said peripheral portions with little or no bond at said peripheral portions.

15. A method according to claim 14, in which said covering material is stretched by use of a die having a substrate-contacting surface which is shaped to conform generally to said substrate but which is progressively more undercut with respect to said substrate proceeding outwardly from said interior portions to said peripheral portions.

16. A method according to claim 14, in which said covering material is attached at its periphery to said shell, and there is no glue bond between said covering material and the foam covering of said shell in the region immediately adjacent to the attachment of said covering material to said shell.

* * * * *